United States Patent [19]
Baronowski et al.

[11] Patent Number: 5,926,800
[45] Date of Patent: *Jul. 20, 1999

[54] SYSTEM AND METHOD FOR PROVIDING A LINE OF CREDIT SECURED BY AN ASSIGNMENT OF A LIFE INSURANCE POLICY

[75] Inventors: Walter Baronowski, New York, N.Y.; Michael Feldstein; Robert Meenan, both of Newton, Mass.; Victor Simone, New York, N.Y.; David Weil, New York, N.Y.; Andrew Young, New York, N.Y.

[73] Assignee: Minerva, L.P.

[*] Notice: This patent issued on a continued prosecution application filed under 37 CFR 1.53(d), and is subject to the twenty year patent term provisions of 35 U.S.C. 154(a)(2).

[21] Appl. No.: 08/427,405

[22] Filed: Apr. 24, 1995

[51] Int. Cl.[6] ................................................. G06F 17/60
[52] U.S. Cl. .................................... 705/35; 705/4; 705/38
[58] Field of Search .................................... 364/401, 406, 364/408; 395/202–204; 283/54; 705/2–4, 35, 38

[56] References Cited

U.S. PATENT DOCUMENTS 5,083,270  1/1992  Gross et al. ........................... 364/408

OTHER PUBLICATIONS

Koco, Co. Offers collateralized loans for living benefits. (Security Life of America loans against life insurance policies for terminal illness or care), National Underwriter Life & Health Financial Services Edition, n23, p7(2), Jun. 8, 1992, Dialog file 148, Accession No. 05890982.

Mack, "Insurance for the living", Black Enterprise, v25n12 PP: 100–102, Jul. 1995, Dialog file 15, Accession No. 01054083.

Drivanos, "Crisis planning for disaster, illness and unemployment", Journal of Financial Planning, v8 n1, PP: 29:33, Jan. 1995, Dialog File 485, Acc. No. 00507833.

"Firm Will Fund Terminally Ill Who Lack Accelerated Benefits", Financial Services Week Nov. 2, 1992 p.12, Dialog File 16, Acc. No. 04149976.

"Living Tea Debuts", Financial Services Week, Jun. 10, 1991, p. 30, Dialog File 16, Acc. No. 03180650.

Schlesinger, et al. "Getting tax–free treatment for accelerated death benefits," Practical Accountant v26 n11 PP.: 67–69 Nov. 1993, Dialog File 485, Acc. No. 00436138.

Powell, "The Need For Increased Life Insurance Due Diligence", Trusts & Estates v13 n5 PP.:39–44 1992, Dialog File 15, Acc No. 00611514.

Poe et al., "Imminent death and accelerated benefits: The regulatory environment", Journal of Insurance Regulation v12 n1 PP.:28–56 Fall, Dialog File 485, Acc No. 00428157.

*Primary Examiner*—Frantzy Poinvil

[57] ABSTRACT

A system for providing loans to owners of life insurance policies who are terminally ill or aged. The system comprises a statistical module, medical module and a financial module which together operate on a preselected group of inputs to yield a line of credit offered to the policyholder. The system provides a line of credit line of credit to those insured under an insurance policy without transfer of ownership of the policy. The system determines eligibility and the line of credit for the insured. The system has an entering device for entering an insured's application data, including the insured's date of birth and the medical diagnosis of the insured, and for generating an output therefrom. The system also has a generating device for receiving the output from the entering device and for generating a function therefrom having a probability distribution describing the future life distribution of the insured and a computing device for receiving the function from the generating device and for computing the line of credit to be extended to the insured based upon the received function and financial assumptions. The owner retains ownership of the policy during his lifetime, and the insured has a line of credit extended as determined by the system.

11 Claims, 12 Drawing Sheets

Overview of Present Invention

Steps in Developing and Validating a Survival Model

1. Identify best predictors of survival using current literature and medical expertise.

2. Identify relevant database(s) for use in model development.

3. Examine data via exploratory graphical techniques to ascertain salient features of the hazard function.

4. Fit model(s) to data using both parametric and semiparametric (Cox) regression techniques.

5. Verify model acceptability to medical experts; modify model as necessary.

6. Apply refined model to various subsets of data to determine stability of parameter estimates.

7. Validate model using independent data sets by examing goodness of fit of observed to model-based predicted survival.

8. Build library datafile for each survival model.

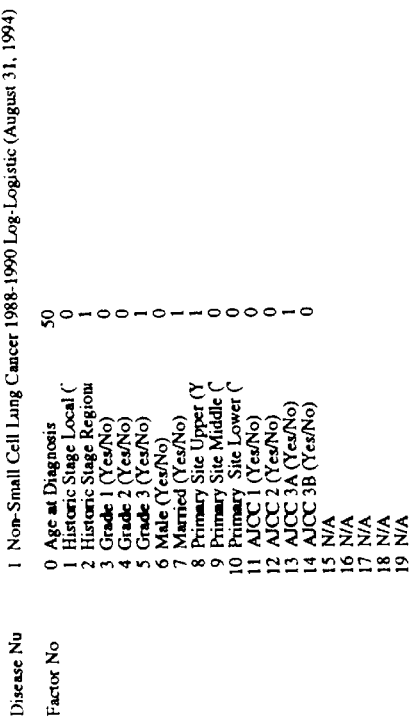
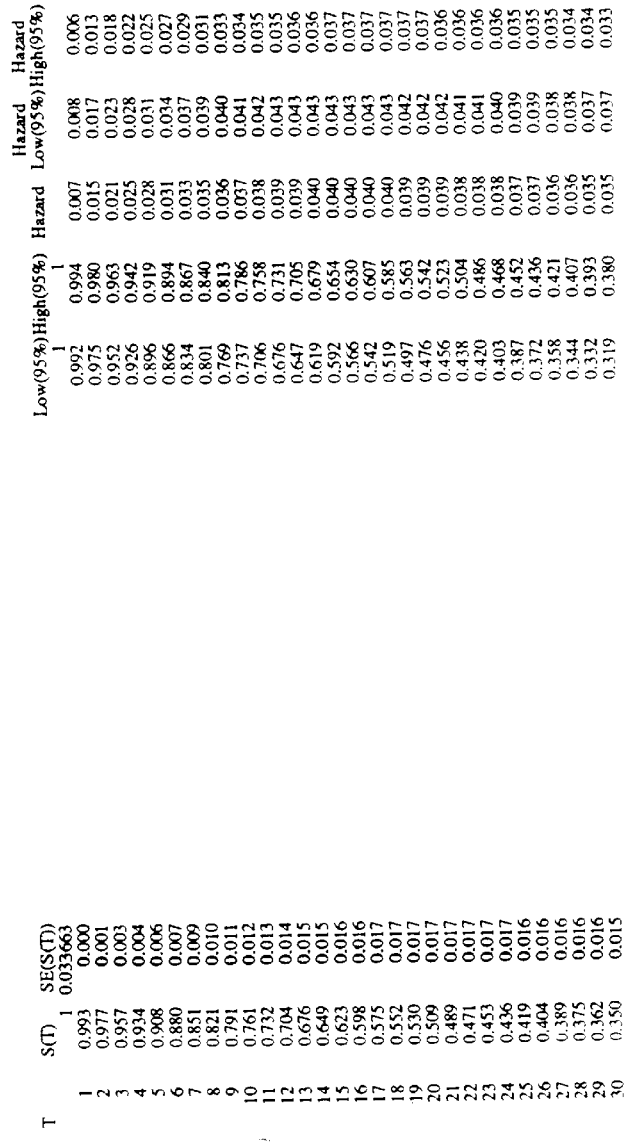
FIGURE 8

| Row | | | | | | | |
|---|---|---|---|---|---|---|---|
| 31 | 0.338 | 0.015 | 0.308 | 0.367 | 0.034 | 0.036 | 0.033 |
| 32 | 0.326 | 0.015 | 0.297 | 0.355 | 0.034 | 0.035 | 0.032 |
| 33 | 0.315 | 0.015 | 0.287 | 0.344 | 0.033 | 0.035 | 0.032 |
| 34 | 0.305 | 0.014 | 0.277 | 0.333 | 0.033 | 0.034 | 0.032 |
| 35 | 0.295 | 0.014 | 0.268 | 0.323 | 0.032 | 0.034 | 0.031 |
| 36 | 0.286 | 0.014 | 0.259 | 0.313 | 0.032 | 0.033 | 0.031 |
| 37 | 0.277 | 0.013 | 0.250 | 0.303 | 0.031 | 0.033 | 0.030 |
| 38 | 0.268 | 0.013 | 0.242 | 0.294 | 0.031 | 0.032 | 0.030 |
| 39 | 0.260 | 0.013 | 0.234 | 0.286 | 0.030 | 0.032 | 0.030 |
| 40 | 0.252 | 0.013 | 0.227 | 0.277 | 0.030 | 0.031 | 0.029 |
| 41 | 0.245 | 0.012 | 0.220 | 0.269 | 0.029 | 0.031 | 0.029 |
| 42 | 0.238 | 0.012 | 0.213 | 0.262 | 0.029 | 0.030 | 0.028 |
| 43 | 0.231 | 0.012 | 0.207 | 0.254 | 0.028 | 0.030 | 0.028 |
| 44 | 0.224 | 0.012 | 0.201 | 0.247 | 0.028 | 0.029 | 0.028 |
| 45 | 0.218 | 0.011 | 0.195 | 0.240 | 0.028 | 0.029 | 0.027 |
| 46 | 0.212 | 0.011 | 0.190 | 0.234 | 0.027 | 0.028 | 0.027 |
| 47 | 0.206 | 0.011 | 0.184 | 0.228 | 0.027 | 0.028 | 0.026 |
| 48 | 0.201 | 0.011 | 0.179 | 0.222 | 0.026 | 0.027 | 0.026 |
| 49 | 0.195 | 0.010 | 0.174 | 0.216 | 0.026 | 0.027 | 0.026 |
| 50 | 0.190 | 0.010 | 0.170 | 0.211 | 0.026 | 0.026 | 0.025 |
| 51 | 0.185 | 0.010 | 0.165 | 0.205 | 0.025 | 0.026 | 0.025 |
| 52 | 0.181 | 0.010 | 0.161 | 0.200 | 0.025 | 0.025 | 0.025 |
| 53 | 0.176 | 0.010 | 0.157 | 0.195 | 0.025 | 0.025 | 0.024 |
| 54 | 0.172 | 0.009 | 0.153 | 0.191 | 0.024 | 0.025 | 0.024 |
| 55 | 0.167 | 0.009 | 0.149 | 0.186 | 0.024 | 0.024 | 0.024 |
| 56 | 0.163 | 0.009 | 0.145 | 0.182 | 0.024 | 0.024 | 0.023 |
| 57 | 0.160 | 0.009 | 0.142 | 0.177 | 0.023 | 0.024 | 0.023 |
| 58 | 0.156 | 0.009 | 0.138 | 0.173 | 0.023 | 0.023 | 0.023 |
| 59 | 0.152 | 0.008 | 0.135 | 0.169 | 0.023 | 0.023 | 0.022 |
| 60 | 0.149 | 0.008 | 0.132 | 0.166 | 0.022 | 0.023 | 0.022 |
| 61 | 0.145 | 0.008 | 0.129 | 0.162 | 0.022 | 0.022 | 0.022 |
| 62 | 0.142 | 0.008 | 0.126 | 0.158 | 0.022 | 0.022 | 0.021 |
| 63 | 0.139 | 0.008 | 0.123 | 0.155 | 0.021 | 0.022 | 0.021 |
| 64 | 0.136 | 0.008 | 0.120 | 0.152 | 0.021 | 0.021 | 0.021 |
| 65 | 0.133 | 0.008 | 0.118 | 0.148 | 0.021 | 0.021 | 0.021 |
| 66 | 0.130 | 0.007 | 0.115 | 0.145 | 0.021 | 0.021 | 0.020 |
| 67 | 0.127 | 0.007 | 0.113 | 0.142 | 0.020 | 0.021 | 0.020 |
| 68 | 0.125 | 0.007 | 0.110 | 0.139 | 0.020 | 0.020 | 0.020 |
| 69 | 0.122 | 0.007 | 0.108 | 0.136 | 0.020 | 0.020 | 0.020 |
| 70 | 0.120 | 0.007 | 0.106 | 0.134 | 0.020 | 0.020 | 0.020 |
| 71 | 0.117 | 0.007 | 0.104 | 0.131 | 0.020 | 0.020 | 0.019 |
| 72 | 0.115 | 0.007 | 0.102 | 0.129 | 0.019 | 0.019 | 0.019 |
| 73 | 0.113 | 0.006 | 0.099 | 0.126 | 0.019 | 0.019 | 0.019 |
| 74 | 0.111 | 0.006 | 0.098 | 0.124 | 0.019 | 0.019 | 0.019 |
| 75 | 0.108 | 0.006 | 0.096 | 0.121 | 0.019 | 0.019 | 0.018 |
| 76 | 0.106 | 0.006 | 0.094 | 0.119 | 0.018 | 0.019 | 0.018 |
| 77 | 0.104 | 0.006 | 0.092 | 0.117 | 0.018 | 0.018 | 0.018 |
| 78 | 0.102 | 0.006 | 0.090 | 0.115 | 0.018 | 0.018 | 0.018 |
| 79 | 0.101 | 0.006 | 0.089 | 0.113 | 0.018 | 0.018 | 0.018 |
| 80 | 0.099 | 0.006 | 0.087 | 0.111 | 0.017 | 0.018 | 0.018 |
| 81 | 0.097 | 0.006 | 0.085 | 0.109 | 0.017 | 0.018 | 0.017 |
| 82 | 0.095 | 0.006 | 0.084 | 0.107 | 0.017 | 0.017 | 0.017 |
| 83 | 0.094 | 0.006 | 0.082 | 0.105 | 0.017 | 0.017 | 0.017 |
| 84 | 0.092 | 0.006 | 0.081 | 0.103 | 0.017 | 0.017 | 0.017 |
| 85 | 0.090 | 0.005 | 0.079 | 0.101 | 0.017 | 0.017 | 0.017 |
| 86 | 0.089 | 0.005 | 0.078 | 0.100 | 0.017 | 0.017 | 0.017 |
| 87 | 0.087 | 0.005 | 0.077 | 0.098 | 0.017 | 0.017 | 0.017 |
| 88 | 0.086 | 0.005 | 0.075 | 0.096 | 0.017 | 0.017 | 0.017 |
| 89 | 0.084 | 0.005 | 0.074 | 0.095 | 0.016 | 0.017 | 0.017 |

SYSTEM AND METHOD FOR PROVIDING A LINE OF CREDIT SECURED BY AN ASSIGNMENT OF A LIFE INSURANCE POLICY

BACKGROUND OF THE INVENTION

1. Field of the Invention

The present invention generally relates to a system for providing loans to owners of life insurance policies who are terminally ill or aged. More specifically, the system comprises a statistical module, medical module and a financial module which together operate on a preselected group of inputs to yield a line of credit offered to the policyholder.

2. Description of the Related Art

There are many commercial reasons why life insurance policy holders may want to collect their death benefits prior to their death. Often the owner originally purchased the policy to provide financial support for minor children or a spouse with a long life expectancy in the event of the death of the wage-earning insured. As the insured grows older and retires, those reasons for owning life insurance may no longer apply. Instead, both the terminally ill and the elderly often face the dilemma of owning significant life insurance policies, yet not having sufficient funds for present-day expenses. The insured needs access to the life insurance proceeds while alive for paying rent and buying groceries as well as for luxuries such as taking a vacation. Also, access to life insurance proceeds can allow for estate planning transactions such as paying off a home mortgage, purchasing annuities for family members, or avoiding the sale of appreciated assets eligible for stepup in basis at death. Finally, terminally ill individuals often need sophisticated medical treatments which are classified as experimental or not FDA-approved. Many health policies do not cover these treatments, and the patient is left to his or her own financial resources which may be limited or illiquid.

A number of previously known methods address these difficulties by exploiting life insurance policies held by the elderly or the terminally ill. One of these is the Accelerated Death Benefit Option ("ADBO") offered by some life insurance companies to permit the insured an opportunity to "cash out" his death benefits under certain restrictive conditions. Under ADBOS, the insurance company offers to pay to an insured while still living the death benefits payable under his or her life insurance policy less a discount to reflect an interest charge. ADBOs are governed by state insurance laws and regulations. In 1991, the National Association of Insurance Commissioners (NAIC) adopted an Accelerated Benefits Model Regulation which has been adopted by many states. Following the NAIC model, many state regulations restrict ADBC to policyholders with less than twelve months to live and limit the interest rate used to calculate the applicable discount. In practice, most insurance companies only offer the option to insureds with six months or less to live, limit the ADBO to a portion of the full face value, and require that the policyholder obtain a doctor's certification of his or her limited life expectancy. ABDOs present several drawbacks. First, as a practical matter, doctors are often reluctant to provide the certification required by state regulation. Second, for federal tax purposes, it is currently unclear whether ADBO payments qualify as insurance proceeds payable under an insurance contract which are excluded from income or are fully taxable. The IRS has issued proposed regulations which exclude from income "qualified accelerated death benefits" which are defined as certain accelerated payments to insureds with illnesses expected to result in death within twelve months. In addition, similar legislative proposals have been made in Congress. Until any of those regulatory or legislative proposals are finalized, ABDOs should be treated as fully taxable income. Third, use of an ADBO yields proceeds that may violate the "limited assets" test used to determine eligibility for Medicaid, hospice care, and supplemental income benefits.

A second known method of providing funds consists of loans offered by life insurance companies to their existing policyholders. A first drawback with this method is that, by state regulation, the loan amount is limited to the cash surrender value of the policy, not the policy's face amount. This requirement imposes a severe limitation on policyholders having little cash value in their policies. The extreme case is presented by term or group insurance policies which, having no cash surrender value, are ineligible for policy loans of this sort. Even in the best case, cash surrender values rarely exceed 50% of the policy's face amount. A second drawback of extending a loan based on an existing life insurance policy is that state regulation also caps the interest rate that insurance companies may charge for such loans. The fact that these regulated rates are generally below market rates of return presents a significant disincentive for insurance companies to offer the loans.

A third known method of offering funds to patients having short life expectancies is practiced by companies known as "viatical settlement companies". These companies purchase policies from terminally ill patients at a discount to their face value often from 20% to 50%. Upon the insured's death, the viatical settlement company collects the full face amount of the insurance policy. The financial return to the viatical company is based on the discount used to determine the purchase price and the length of time until the insured dies. There are several disadvantages to the insured from selling a policy to a viatical company. First, the transaction is a sale of the policy and not a loan against the policy, and the proceeds constitute taxable income to the insured. Second, unlike a loan, if the insured dies quickly, the viatical company collects a windfall as no residual benefits are owned to the insured's estate. Third, as with ADBO's, sale to a viatical company yields income that may result in violations of the governmental needs-based tests, thereby rendering the patient ineligible for various benefits. Many states are currently enacting regulation based on the NAIC Viatical Settlements Model Regulation to impose limits on the discount rates used (by imposing minimum percentages of face value based on life expectancies) and to impose licensing and reporting requirements.

SUMMARY OF THE INVENTION

In view of the foregoing, there exists a need in the field for a system which can be used by a financial services company (hereafter, a "provider") to offer a life minsurance policyholder (hereafter, a "policyholder" or "insured") a line of credit based on his health and based on various financial parameters, while allowing the provider to define and manage the risks involved in order to maximize its expected return, and avoiding the restrictions of the other alternatives discussed above.

According to one aspect of the invention, a system is described for providing a line of credit to those insured under an insurance policy without transfer of ownership of the policy. The system determines eligibility and the line of credit for the insured. The system comprises an entering means for entering an insured's application data, including the insured's date of birth and the medical diagnosis of the insured, and for generating an output therefrom. The system also comprises a generating means for receiving the output from the entering means and for generating a function therefrom having a probability distribution describing the future life distribution of the insured. The system further comprises a computing means for receiving the function from the generating means and for computing the line of credit to be extended to the insured based upon the received function and financial assumptions. The owner retains ownership of the policy during his lifetime, and the insured has a line of credit extended as determined by the system.

It is a further object of this invention to provide a system for processing disease input information and financial input information in order to determine the line of credit to thereby define and manage the risks involved.

It is a still further object of the invention to provide a system which both avoids subjective measures of life expectancy and which does not require a doctor's certification.

It is another object of this invention to provide a system which bases the line of credit on the face value (as opposed to the cash surrender value) of the life insurance policy, thereby permitting loans secured by both policies in which a cash surrender value may be built up, such as whole life policies, as well as those policies which do not have an accumulated cash value, such as term life and group life policies.

It is still another object of this invention to have a system which does not transfer ownership of the insurance policy, so that the insured does not have increased taxable income.

It is still another object of this invention to have a system which does not cause the policyholder to violate the federal government's "limited assets" test that may in turn lead to a forfeiture of various other benefits, for example, Medicaid.

It is yet another object of this invention to enable the provider to earn a market rate of return in extending the line of credit and avoid the limits on interest imposed by state insurance regulations and proposed tax regulations.

These and other objects of the present invention are realized in a system that comprises a statistical module, a medical module and a financial module. The statistical module uses publicly available medical databases and the experience of the provider to create a library of disease-specific survival models. The medical module uses as its inputs the library of statistical models and personal and medical data specific to an individual policy holder applicant to generate a probability distribution of life expectancy and associated variances for the individual policyholder. This probability distribution of life expectancy is only one of several inputs which is used by the financial module. Other inputs which are used by the financial module comprise various market parameters, along with specific parameters of the individual owner's insurance policy (e.g., its death benefit, premiums, etc.). The financial module processes these inputs to compute a line of credit for the policyholder. This line of credit may be taken as a lump sum or used to support loans taken out by the policyholder.

In accordance with the present invention, once the amount of the line of credit has been determined and the policyholder accepts the line of credit, the policy is irrevocably assigned to a trust. Beneficiary waivers are executed naming the provider as the primary beneficiary and the previously named beneficiaries (or others) as residual beneficiaries.

As the policyholder takes out the non-recourse loans against his line of credit, the amounts of the loans, the interest on these loans, the insurance premiums being paid by the provider, and setup and management fees all accumulate, until the time that the policyholder dies. The total accumulated amount due to the provider is paid upon the insured's death from the life insurance proceeds. The excess (i.e., the full death benefits of the policy less the accumulation), if any, is paid to the residual beneficiaries. No amounts are paid to the provider prior to the policyholder's death.

With these and other objects, advantages, and features of the invention that may become hereinafter apparent, the nature of the invention may be more clearly understood with reference to the following detailed discussions of specific embodiments, the appended claims, and the several drawings attached herein which illustrate and exemplify such embodiments.

BRIEF DESCRIPTION OF THE DRAWINGS

A specific embodiment of the present invention will be described with reference to the following drawings, wherein:

FIG. 3 depicts in block diagram form the steps in developing the statistical model.

FIG. 6 is a continuation of the data depicted in FIG. 5.

FIG. 8 graphically depicts the hazard function for the policyholder in FIG. 5.

FIG. 9 depicts in tabular form the survival curve and the hazard function for the same hypothetical policyholder based on a statistical model generated from lung cancer data from 1988 to 1990.

DETAILED DESCRIPTION OF THE INVENTION

The following preferred embodiment as exemplified by the drawings is illustrative of the invention and is not intended to limit the invention as encompassed by the claims of this application.

The life insurance monetarizing system of the invention enables a provider to determine a line of credit and extend it to a life insurance policyholder. As the policyholder borrows money under the line of credit that has been extended, the system maintains an up-to-date account of the money that has been borrowed, the interest that has accrued on the money borrowed, the premiums that have been paid by the provider to the insurer on behalf of the policyholder, and the various fees that have been charged the policyholder to set up and maintain the line of credit. When the policyholder dies, the system uses the life insurance proceeds to reimburse the provider for the total amount charged to the account. Unlike viatical settlement systems, the present system pays any excess to the residual beneficiaries.

Figure 1:
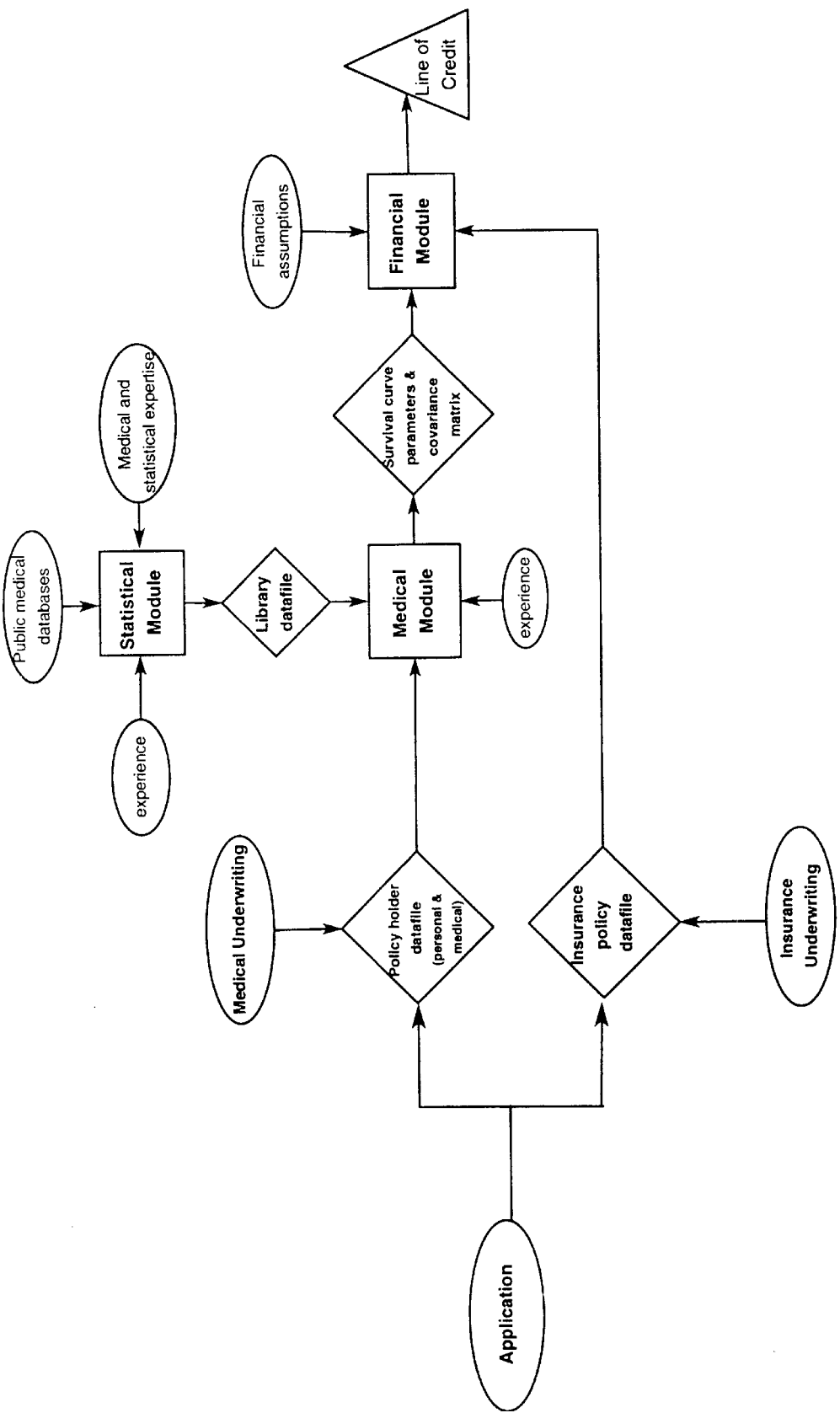
FIG. 1 depicts in block diagram form an overview of the present invention.

Referring to FIG. 1, the life insurance monetarizing system of the invention is depicted generally by the block diagrams of the flow charts. The system generally comprises three modules: a statistical module, a medical module and a financial module. The statistical module uses both medical databases, medical and statistical expertise and the provider's experience to create a library datafile of disease specific statistical models. The medical module combines specific policyholder information with the library datafile to generate survival curve parameters and a covariance matrix specific to the policyholder applicant. That information is then combined with financial assumptions and insurance policy information by the financial module to calculate the line of credit the provider is willing to offer.

The system of the present invention is implemented on a general purpose computer, wherein the computer is capable of accepting input, processing the input according to prescribed rules, and producing results as output. The system is comprised of an entering means, a generating means and a computing means. The statistical module is an entering means which accepts input (application data) including date of birth and medical diagnosis and generates an output corresponding to said input. The medical module is a generating means which receives output from the statistical module and uses it to generate a survival curve parameters and a covariance matrix. The financial module is a computing means which receives input from the medical module and computes a line of credit.

Figure 2:
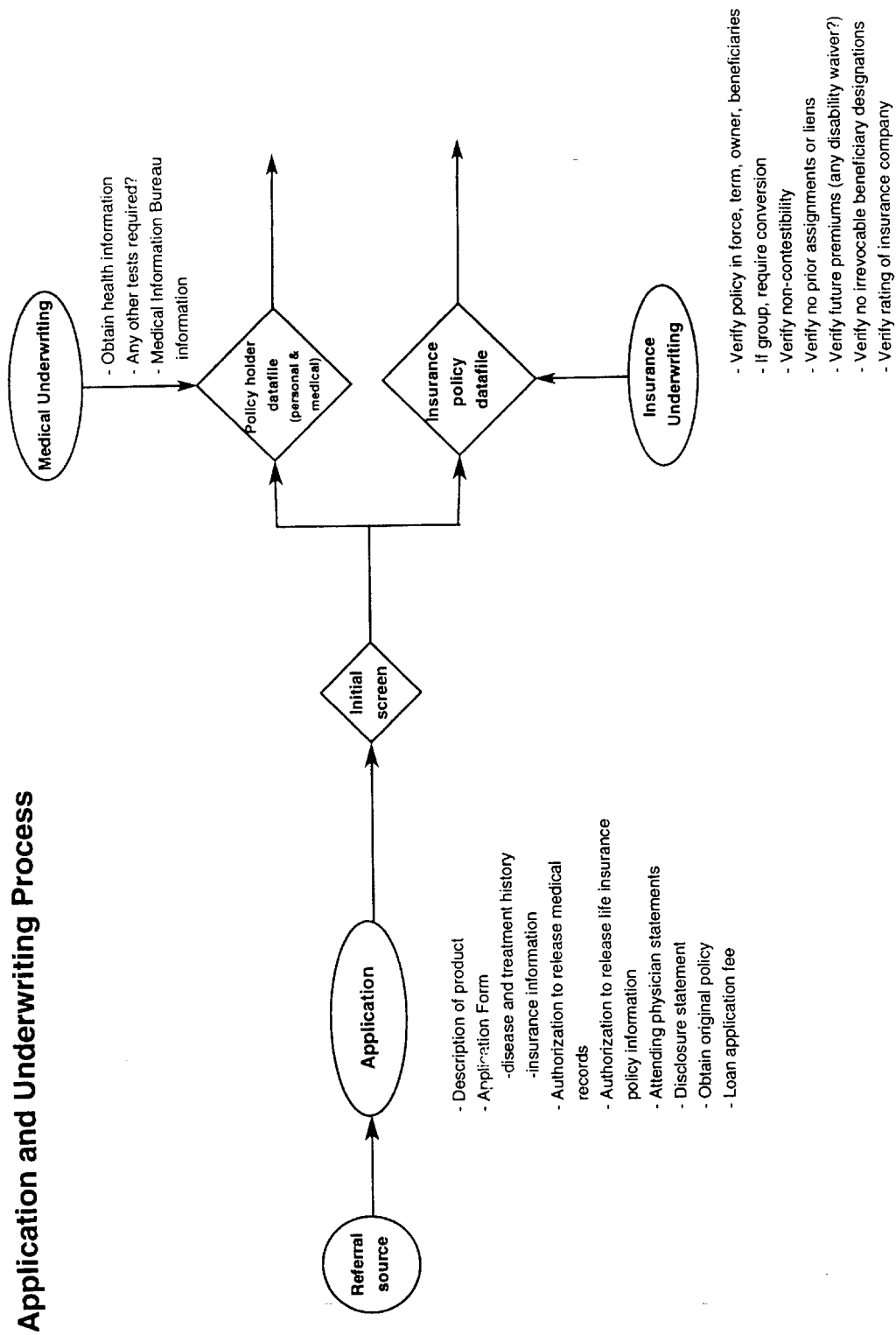
FIG. 2 depicts in block diagram form the application and underwriting process.

Referring to FIG. 2 the policyholder is directed by a referral source to the provider, who operates the disclosed system. The referral source may be an insurance salesperson, hospital, AIDS clinic, physician, nursing home, attorney, accountant, advertisement, social worker, employee benefits administrator, financial planner or other promotional material. At the provider's request, the policyholder completes various forms including an application form which includes a health questionnaire, medical release forms, and an insurance policy release form. The application form for initially applying to the system described requires a variety of information. This information is used both for directly assessing the eligibility of the insured and for any future assessments or studies that the system operator may undertake. Typically, the name, address and telephone number of the insured is requested along with the date of birth, social security number and a work history. Additionally, a drivers license number and voter registration number may be requested,. Further information includes names and ages of dependents, questions regarding financial solvency and judgments outstanding, benefits received, for example medicaid, and detailed life insurance questions regarding the policy in question along with an authorization for the insurance company to release policy information. Detailed medical information is also required, including an authorization to release all medical records. Both release forms are signed and notarized by the policyholder, and the medical release form is sent to the client's physician or hospital. The insurance release form is forwarded, along with a letter requesting policy information, to the insurer. The provider may also request additional medical or financial information from a third party source, such as the Medical Information Bureau or TRW, for cross-checking the data submitted by policyholder on the questionnaire.

After reviewing the data on the application form and the health questionnaire, the provider makes a threshold determination as to whether the policyholder suffers from any of a number of predetermined terminal diseases or is of sufficiently advanced age. (As will be seen below, the invention is particularly useful and applicable for the elderly as well as those suffering from a terminal disease.) If so, the policyholder is said to have a "target condition" that potentially qualifies him or her for eligibility for the line of credit extended by the system described herein, and processing of the policyholder's data continues. Thereupon, additional data from the application form and questionnaire, as well as the policy information later received from the insurer and any cross-checking information received, are entered into a computer datafile, continually updated by the provider and newly created for each policyholder. If ineligibility for the system is established at any point, processing stops.

For each selected disease, the flow diagram in FIG. 3 summarizes the steps involved in the model development and validation. The statistical model uses the public medical databases, the medical and statistical expertise and the experience of the provider to create the library datafile of disease-specific statistical models. The public medical databases can be conventional, public domain databases, such as CDC or SEER. The Center For Disease Control (CDC) in Atlanta maintains the AIDS Public Information Data Set by compiling case reports submitted by individual state and loal health departments. The SEER database is a national cancer registry maintained by the National Institutes of Health in Bethesda, Md. Each entry of the database used corresponds to an individual and includes a number of personal parameters and medical parameters. Personal parameters include such data as the person's sex, race, vital status, age at time of death if deceased, whether or not the person was a smoker, etc. The personal parameters may also include other factors depending on the particular database selected. In addition, if the person is believed to have died as a result of some terminal illness, the database entry for that person includes various medical parameters. The medical parameters comprise the name of the disease that caused the person's death, the person's age when first diagnosed with the disease, and other parameters defining the stage, extent, subtype, or severity of the disease. Initially, the statistical module utilizes these aforementioned publicly available databases. Thereafter, the user may use his own datasets for formulating his own predictive statistical model. By applying statistical methods and clinical judgment to decide which medical and other factors should be included, a new predictive model may be generated. The new predictive model is tested for accuracy. The result of that work is in the form of the statistical model, its parameters and its associative variance measures. The results are then stored and applied to individual customers in this chart. As described hereinafter, the system will select particular personal and medical parameters that the provider decides are the most predictive for determining of the life expectancy of the policyholder.

Each entry of the experience database corresponds to a person who was at some previous time extended a line of credit by the provider. The entries in this database contain data for parameters thought by the provider to have some statistical significance in predicting survivability but not appearing in the general public domain medical database. For example, as it extends lines of credit to policyholders over some period of time, the provider may detect some correlation between the policyholders' socioeconomic backgrounds and their survivability. If so, the provider would add to the experience database socioeconomic data (plus associated personal and medical data, such as age at time of death, sex, and the like) for each deceased policyholder it once serviced. Additional tests concerning the patients' medical status may also be included.

The most commonly employed statistical models for characterizing survival of chronic disease patients are the exponential, the Weibull, the log-normal, the log-logistic and the Gamma distribution. In almost every case, modelling proceeds from the hazard function, also known as the force of mortality or the instantaneous failure rate. There is a one-to-one relationship between the hazard function and the survival distribution. Explanatory variables are taken into account and examined for their statistical significance by modelling one or more parameters of the hazard function as a function of these variables.

Given the survival information and explanatory variables for patients with a given disease, parameter estimates and their approximate standard errors are produced using the method of minimum likelihood estimation. Once parameters have been estimated, future survival can be predicted for any specified set of values of the explanatory variables. The adequacy of the fitted model can be determined both informally using graphical procedures and more formally using goodness-of-fit procedures. In the later case, observed and expected number of patients are compared for agreement over selected intervals of time. Estimated mortality tables can then be constructed from the fitted model.

Once the model has been fitted, it is important to validate it using similar data. One way to achieve this is to take the original data set and split it randomly into two parts. One part would be used for the actual model fitting, and the remaining part would be set aside for validation. This splitting of the data can occur in several ways depending upon the selected external criteria for validation. For example, to determine whether chronologic time influences model selection and estimation, the database would be split into earlier versus more recent cases. Validation then consists of examining both the choice of the underlying form of the hazard function and the accuracy of the model in terms of goodness-of-fit. The procedure to test goodness-of-fit consists in applying the predicted model developed with the first data set to the subjects in the second (validation) data set. The actual goodness-of-fit statistic would involve a direct comparison of observed survival to predicted survival, in the validation data set, across the specified intervals of the mortality table.

An additional check on the adequacy of the model and the selection of significant explanatory variables is provided by the semiparametric technique known commonly as Cox regression analysis. In this approach, no assumption is made about the underlying hazard function.

The output of the statistical module is the library datafile which contains a library of target conditions, i.e., the names of qualifying diseases for eligibility to the system or "advanced age." For each target condition listed, the datafile contains:

(1) the form of the statistical model that has been identified as producing the best estimate of survivability. The model is identified by careful examination of the applicability of the model to the medical and experiential databases. Often, a particular model will be found to be flawed in that it tends to exaggerate mortality for certain individuals and underestimate mortality for others. Sometimes, a model will not exhibit any such biases, but may still overestimate the force of mortality for a certain portion of the survival probability curve and underestimate the force of mortality on another portion of the curve, while estimating the correct life expectancy. A good model for an individual's life expectancy would exhibit none of these biases. Based on an examination of lung cancer patients, there are significant differences between individuals with small cell lung cancer (and oat cell lung cancer), which is better predicted by a distribution known as the "generalized gamma" distribution, and non-small cell lung cancers (including large cell, squamous as cell, adenocarcinoma, and bronchoalveolar lung cancer), which is better predicted by a distribution known as the "log-logistic" distribution.

(2) the names and weights for any particular personal and medical parameters that have been identified as having statistical significance in predicting survivability, including a constant weight (hereafter, the "explanatory parameters"). These factors are the most significant predictors in differentiating one individual's survival probability curve from another person's, and the weights delineate the relative impact of the various factors. These weights can also be selected using the least-squares method.

(3) estimates of any parameters used in that statistical model. The estimates and their variances are obtained, for example, as the result of an analysis such as "least-squares" or "maximum likelihood" to find the estimates that minimize the total squared error of the life predictions from the data set.

(4) the covariance matrix for the estimated parameters. The covariance matrix shows the variance of the estimate of the parameters and how an error in estimating one parameter would affect the estimate of all the other parameters. The covariance matrix is estimated using the same methodology as the parameters themselves.

The contents of the library datafile would be constant from policyholder to policyholder, and is therefore generated in advance using the experience and expertise of those skilled in the medical and statistical arts. For example, a person of ordinary skill in the medical art could identify the variables or parameters that may be explanatory, e.g., those that are most predictive of life expectancy, for someone suffering from AIDS complicated by pneumonia. Similarly, a person of ordinary skill in the statistical arts could identify the statistical model (item (1) above) that provides the best fits and predictions for a given disease and the associated explanatory parameters identified by the medical artisan. Although different persons ordinarily skilled in the art could identify factors and create models, the results would vary based on the individuals' judgments.

As an illustrative example of the output of the statistical module to the library datafile, the generalized gamma survival model, used for the target condition "small-cell lung cancer", is given by:

$$S(t)=Pr(survival>t)=function(x, beta, sigma, delta, t).$$

Here, x is a vector of data personal to the policyholder (described in greater detail below), beta is a vector of weight values that determine how the values in vector x are to be weighted, and sigma and delta are parameters further determining the scale and shape of the survival function. This is well known to those skilled in the arts and is described in Cox, D. R., Regression Miodels and Life Tables, *J. R. Statist. Soc. B.,* 34,1989–220, (1972), and Cox, D. R. *Biometrika,* 62, 269–276, (1975), as commonly used by epidimiologists and medical statisticians. These parameters and weights are estimated by the standard statistical technique known as maximum likelihood estimation, using a standard statistical computer language or computer subroutine software package, such as "SAS" (Statistical Analysis Systems, SAS institute Inc., SAS Campus Drive, Carey, N.C.). These estimated values are then filled in library datafile.

The statistical module performs this entire procedure for each target condition listed in the library datefile. It is apparent to one skilled in the art that for a statistical model other than the generate gamma model, S(t) would be a different function with the maximum likelihood estimation being performed by a statistical package such as SAS in a similar manner.

Hence by consulting those skilled in the statistical and medical arts, and then using the statistical module, new entries for new target conditions can be added to the library datafile.

The medical module uses a combination of (1) data from policyholder datafile, (which includes the policyholder's medical and personal profile, including the age of the policyholder and, if applicable, the date when he or she contracted a terminal disease) and (2) data from a library datafile. The medical module processes this data input to yield a datafile representing the survival curve parameters for the policyholder and the covariance matrix. The medical module reads the personal datafile to deter-mine the policyholder's qualifying target condition (i. e., the name of the disease or "advanced age"). The medical module then consults the library datafile to look up the target condition as well as the statistical model, estimates values of the parameters and the covariance matrix and the names and weights of the explanatory parameters that correspond to that target condition. The medical module next engages the personal datafile to read the data corresponding to the names of these explanatory parameters. This data is stored in the vector x referred to above. Finally, the medical module fills in the values of the equation for the statistical model, which yields the estimated survivability probability distribution function for the policyholder. Optimally, and in its preferred embodiment for increased realism, since variances and covariances for the parameters are also available from the library datafile, an entire family of survivability curves could be generated. The information necessary to develop the family of survival curves is generated by the medical module and sent to, and received by, the computational financial module.

One significant characteristic of these survival curves is that they are asymmetric. For a symmetric distribution like the normal distribution, the chance of being at least a given number of standard deviations below the mean is the same as the chance of being at least the same number of standard deviations above the mean. This is not necessarily true for an asymmetric distribution. For the distributions that make a good fit for survival data, the chance of surviving more than a certain number of standard deviations longer than the life expectancy is more than the chance of dying before the same number of standard deviations before the life expectancy. Our invention, which performs more poorly for the provider when customers live longer than expected, as will be seen below, can be expected to perform more negatively the more asymmetric the survival distribution; therefore, it is essential that the survival model accurately reflect the asymmetry and that the financial module take this asymmetry into account.

The financial module uses the functions and variances that were generated by the medical module and determines the line of credit extended to the policyholder. More particularly, the financial module maximizes the expected return to the provider given probabilistic information about the policyholder's life and the prevailing interest rate as well as information concerning the life insurance policy.

The financial module uses a plurality of parameters for computing the line of credit extended to the policy holder. One of these parameters, is a family of hazard functions, which represent the negative rate (derivative) of change of the survival curves as a percentage of the survival and correspond one-to-one with the survival curve from which they are derived. These functions represent the output generated by the medical module. Other parameters include inputs from a datafile containing the face value of the insurance policy, the premium, the setup fee percentage, administrative fee amounts, the probability distribution of the interest rates over the survival period, and other parameters that may influence the precision of the financial module (e.g., the initial face value percentage $L_0$, iteration tolerances, etc.)

In the preferred embodiment, using these inputs, the financial module performs an iterative Monte Carlo simulation to determine what percentage of the policy face value should be offered as a line of credit in order to maximize the provider's expected return. The Monte Carlo simulation estimates the expected present value as a function of the medical and personal parameters, the appropriate disease statistical model, the parameters describing the individual's insurance policy, and the percent of face value extended as an initial line of credit. The optimal percent of face value to extend as a line of credit is determined in an "outer loop" that uses Newton-Raphson or some other solution algorithm to estimate the maximum value of the net present value function described above. The net present value function itself is evaluated using a Monte Carlo "inner loop" that draws random values of interest rates and survival times from the distributions selected from the disease database and medical model, evaluates the net present value of each of the specific cases, and averages a large number of these specific cases to estimate the expected net present value for that individual with that specific disease and the individual's specific insurance policy with an initial loan percentage as specified.

More specifically, in the outer loop, the initial value for the face value percentage $L_0$ is multiplied by the policy face value FV to yield an initial value for the line of credit, $LC_0$.

In the inner loop, a particular survival curve is drawn at random from among the family of curves inputted to the financial module. A remaining life variable "S" is in turn randomly drawn by inverting a random value of T (uniform on [0,1]) on the randomly chosen survival curve. A value for the average interest rate r over the period S (in months) is also drawn at random from the interest rate probability distribution, which in the preferred embodiment test the form of a log-normal distribution with mean and standard deviation inputs to the financial module. Other schemes for determining the appropriate interest rate could include forecasting a different random path of short-term interest rates for each iteration of the model. In this process, the expected value and volatility of future short-term interest rates could be drawn from information currently available in the financial markets. All of the random values are drawn using standard variance reduction techniques, in order to increase the probability that the stream of random values is representative of the distribution, rather than being an anomalous stream (such as the same random value repeated a large number of times: 73, 73, 73, . . . , 73). In its preferred embodiment, the random values applied can also be generated from a pseudo random number generator.

In the most extreme case, the policyholder would choose to borrow the entire amount $LC_0$ at the earliest time possible, thereby maximizing the interest and hence the total amount that would be advanced by the provider ("maximum total amount advanced"). Assuming this extreme case, which is done for reasons to be explained below, the total amount advanced is then calculated for the values of $LC_0$, r, and S chosen, by adding together the following amounts on a case by case basis:

(a) The maximum amount that could be borrowed, which is equal to the amount of the line of credit, $LC_0$;

(b) The maximum interest that could accrue on the $LC_0$ dollars, which is equal to the interest that would accrue if all $LC_0$ dollars were borrowed on day one. This equals the interest on principal amount $LC_0$ over a time period S months based on an interest rate r. Assuming monthly compounding, the interest is given by:

$$LC_0 \left[1 + \frac{r}{12}\right]^S$$

(c) The total premium payments $P_1 + \ldots + P_S$ that would be paid out by the provider to the insurer over the time period S, plus interest thereon;

(d) The maintenance fees $F_1 + F_2 + \ldots + F_S$ that would be charged the policyholder and would accrue over the time period S plus interest thereon;

The net present value to the provider is then further calculated on a case by case basis as the sum of the following:

(a) the fee for setting up the line of credit. In its preferred embodiment, the setup fee $F_0$ would be equal to a predetermined percentage of the line of credit amount $LC_0$.

(b) a negative amount equal to the negative of the line of credit amount $LC_0$.

(c) a negative amount equal to the negative of the sum of the present values of the premium payments $P_1, \ldots, P_S$ over a time period S discounted at the rate r.

(d) the smaller of (1) the accumulated loan balance (calculated as the sum of (a), (b), (c), and (d) in the preceding analysis) and (2) the face value of the policy, discounted back S periods at the rate r.

When the Monte Carlo method is employed, this process is repeated a large number of times, for example, one thousand times, with new values of r and S drawn from the respective probability distributions, with the values for the NPV $N_0$ calculated for each trial averaged together.

Once this inner loop processing is complete, the outer loop chooses a new value for the percentage $L_1$ of policy face value and calculates a new line of credit $LC_1$, which is used by the inner loop to compute a present value $N_1$. After values $N_0$ and $N_1$ have been computed for percentages $L_0$ and $L_1$, a sequence of N values is generated iteratively using a standard iterative technique such as the well-known Newton-Raphson method. This is described in a variety of statistical textbooks, for example, *The Statistical Analysis of Failure Time Data* by J. D. Kalbfleisch and R. L. Prentice, 1980 John Wiley and Sons, Inc. and *Applied Regression Analysis and Other Multivariable Methods*, by David C. Kleinbaum and Lawrence L. Kupper, Duxbury Press. Alternatively, bisection may be employed. When the Newton-Raphson method is used, the iterations continue until a maximum present value N is reached. This maximum, and the corresponding line of credit LC and percentage of face value L, are the outputs of the financial module.

Figure 4:
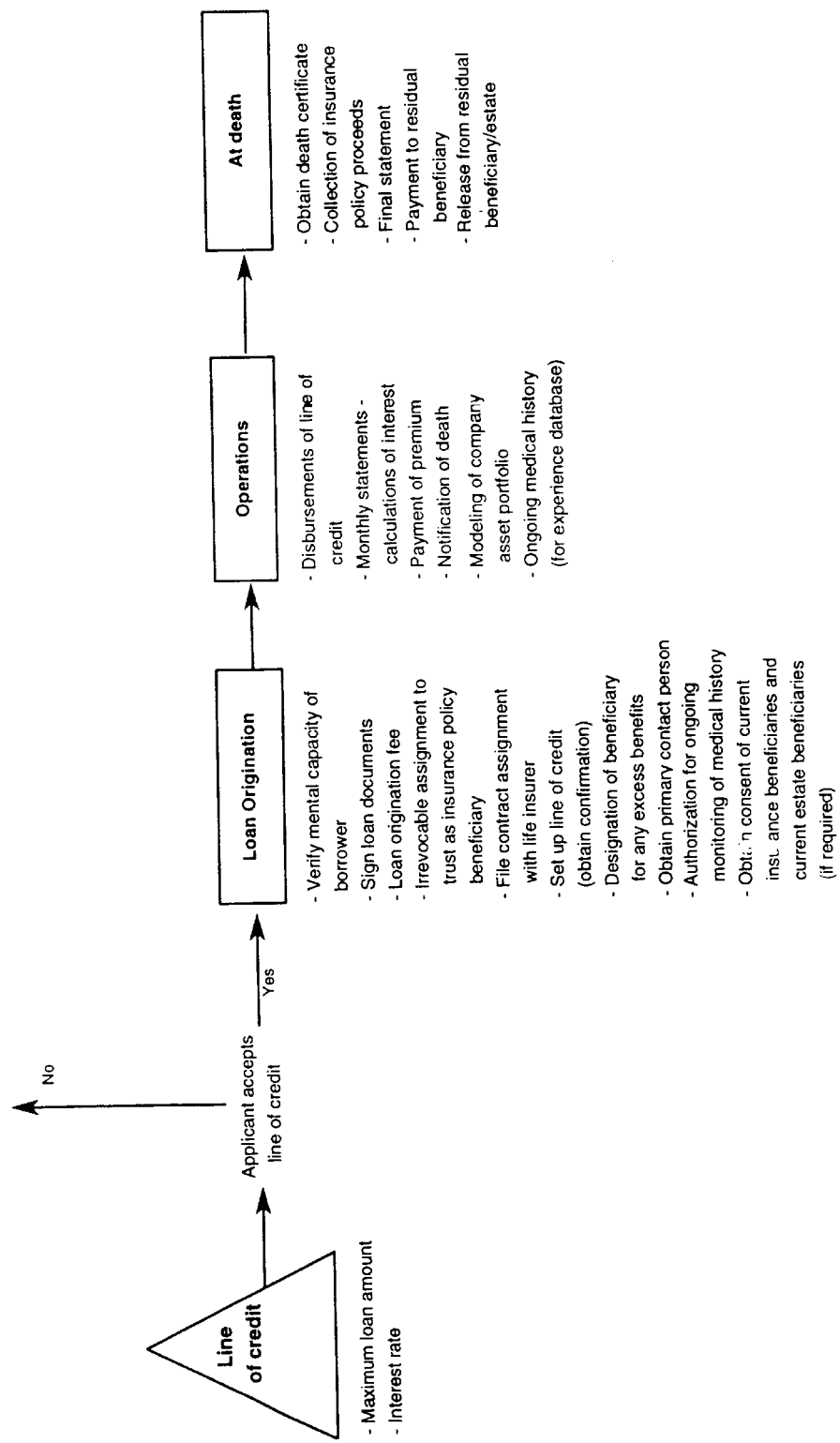
FIG. 4 depicts in block diagram form the operations of the provider.

Once the line of credit has been determined by the financial module, the provider advises the policyholder of the line of credit it is willing to extend, the interest rate at which loans will be made. See FIG. 4. It is apparent that the amount can be extended to the policyholder in the form of a line of credit, under which the policyholder may borrow amounts as desired, or in the form of a lump-sum loan. For illustrative purposes, it is assumed in the following example that a line of credit is being extended.

At the time the line of credit is established, an expense/fee account is set up for the policyholder to maintain a record of all expenses incurred by the provider and all fees assessed by the provider in establishing, extending, servicing, and maintaining the line of credit. The account is established by assessing the initial set-up fee (described above to be some fixed percentage of the line of credit) against the policyholder.

The policyholder may borrow money under the line of credit in many different ways. For example, the policyholder may borrow the entire amount on day one or by borrow smaller amounts over several years or borrow the entire amount on the day before he dies. As the policyholder takes out loans against his particular extended line of credit, the amounts of the loans are charged to the expense/fee account. Also, interest accumulates in the account on each loan from the time the loan is taken out to the repayment of the loan after the time of the policyholder's death. Since the provider assumes the responsibility of paying the insurance premiums, the cost of the premiums also accumulate in the expense/fee account, from the time the line of credit is established to the time of death. Finally, management fees accrue periodically in the expense/fee account.

When the policyholder dies, the entire "accumulation" (i.e., the "total amount advanced" by the provider) in the expense/fee account is deducted from the face value of the policyholder's life insurance policy and kept by the provider. Any excess (i.e., the face value less the accumulation) is paid by the provider to the residual beneficiaries. If the face value is insufficient to cover the accumulation in the account, the entire policy proceeds go to the provider and none accrue to the residual beneficiaries.

Several attributes of the invention should be apparent from the above description. As described above, when a policyholder first begins borrowing money under a newly extended line of credit, the loan amounts, interest, premiums, and fees begin accumulating in the expense/fee account. The accumulation will continually increase over the years, and for a substantial period of time the policy face value will be enough to cover the accumulation. In this case (call it the "surplus regime"), the provider's NPV is given by:

$$NPV = \frac{LC_0\left(1 + \frac{r+c}{12}\right)^S + \left(\frac{P+F}{r+c}\right)\left[\left(1 + \frac{r+c}{12}\right)^{S+1} - \left(1 + \frac{r+c}{12}\right)\right] - LC_0}{\left(1 + \frac{r}{12}\right)^S} - \left(LC_0 + \frac{P+F}{r}\right)\left(1 - \frac{1}{\left(1 + \frac{r}{12}\right)^S}\right) + LC_0 * F_0$$

where $LC_0$ is the amount of the line of credit extended, r is the fixed annual interest rate over time used to finance the line of credit compounded monthly, c is the spread to the financing interest rate used to determine the interest rate charged to customers P is the fixed annual premium charged monthly F is the fixed annual fee S is the life span of the individual under question $F_0$ is the amount of the initial setup fee Since the interest and fees in the surplus regime increase with time, as shown in the above equation, the return continues to increase with time. If the policyholder is unfortunate enough to die during this period, a surplus amount of money will be left after the provider has been recompensed for the amount recorded in the expense/fee account. This surplus will be paid to any residual beneficiary selected by the policyholder.

If the policyholder lives a long enough period of time, at some point the total premiums, interest, and fees may grow to the point where the accumulation exceeds the policy's face value. For example, a policy with a higher annual premium represents a larger risk than a policy with a lower premium. Since the policyholder's interest in the proceeds of the policy is reduced, the company would assume the burden of paying the premium to maintain the value of its collateral. The premium payment would be added on to the balance of the loan. For individual that live significantly longer than the average, these premiums would increase the risk that the loan balance exceeds the face value of the policy. In this case (the "deficiency regime"), the life insurance proceeds will be insufficient to fully reimburse the provider for the total amount it has advanced under the line of credit. Once the deficiency regime obtains, the provider's return is equal to in the deficiency regime:

$$NPV = \frac{Face - LC_0}{\left(1 + \frac{r}{12}\right)^S} - \left(LC_0 + \frac{P+F}{r}\right)\left(1 - \frac{1}{\left(1 + \frac{r}{12}\right)^S}\right) + LC_0 * F_0$$

where $LC_0$ is the amount of the line of credit extended, r is the fixed annual interest rate over time used to finance the line of credit compounded monthly P is the fixed annual premium charged monthly F is the fixed annual fee S is the life span of the individual under question $F_0$ is the amount of the initial setup fee Where p is fixed annual premiums paid monthly, r is a fixed annual rate with monthly compounding, $LC_0$ is the initial line of credit, PTS are charged up front. This amount can be seen to decrease with time (and possibly become negative) as premiums and the cost of maintaining the line of credit continue to accrue. Hence the provider becomes economically worse off the longer the policyholder lives in the deficiency regime. In this scenario, the selected residual beneficiary would not receive any sum.

EXAMPLE

Figure 5:
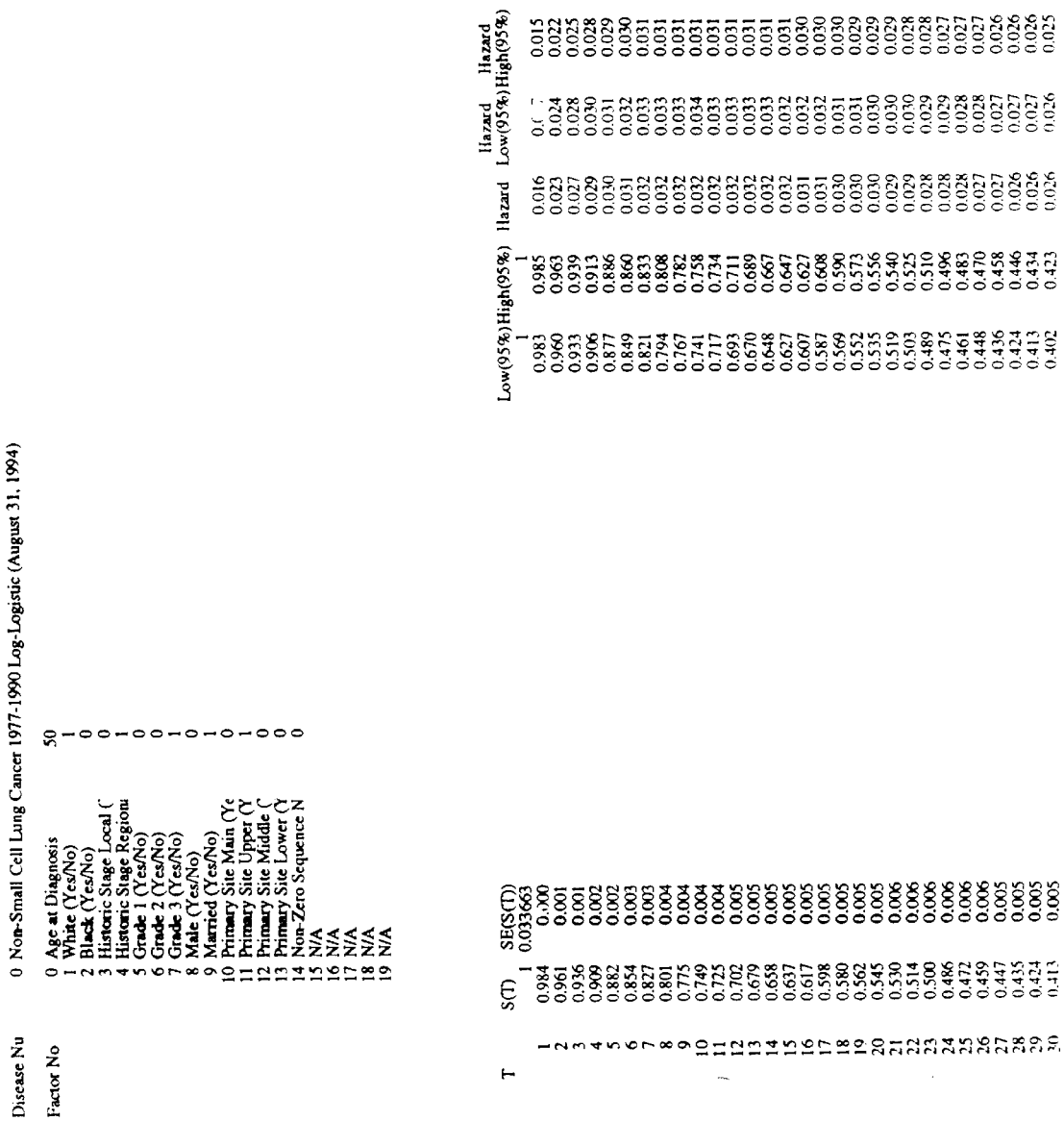
FIG. 5 depicts in tabular form the survival curve and the hazard function for a hypothetical policyholder based on a statistical model generated from SEER lung cancer data from 1977–1990.
Figure 6:
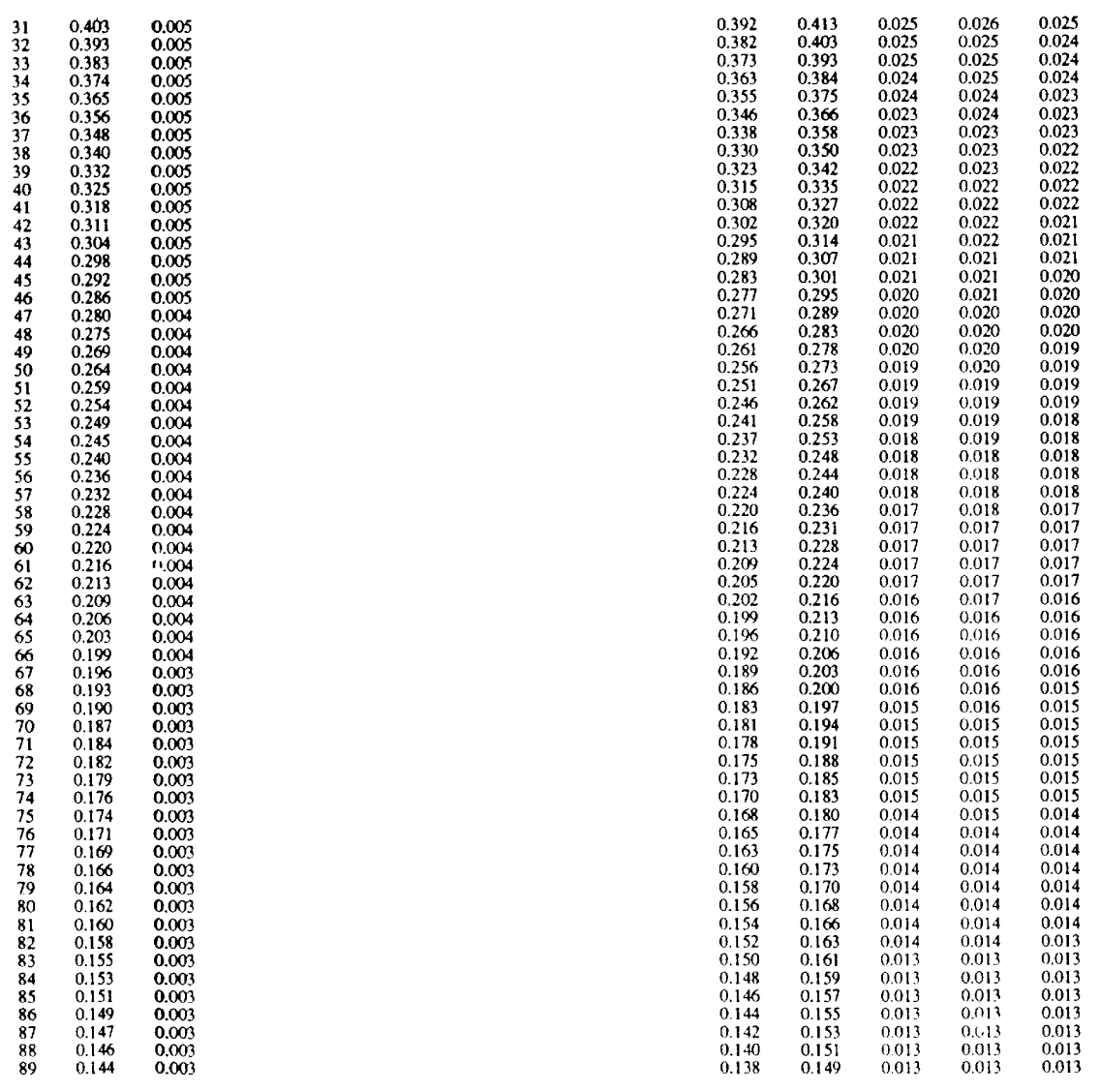
Figure 7:
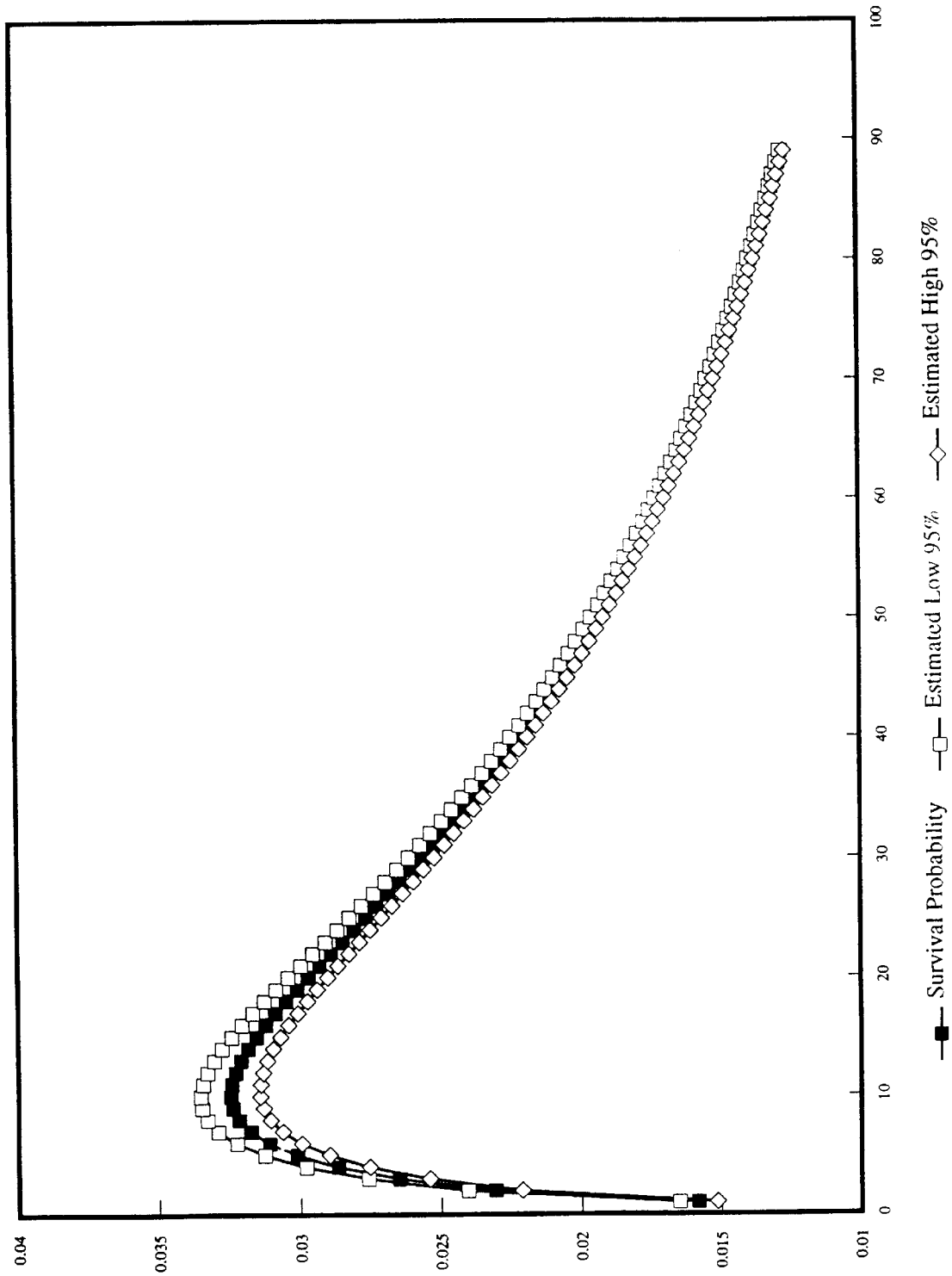
FIG. 7 graphically depicts the survival function for the policyholder in FIGS. 5 and 6.
Figure 10:
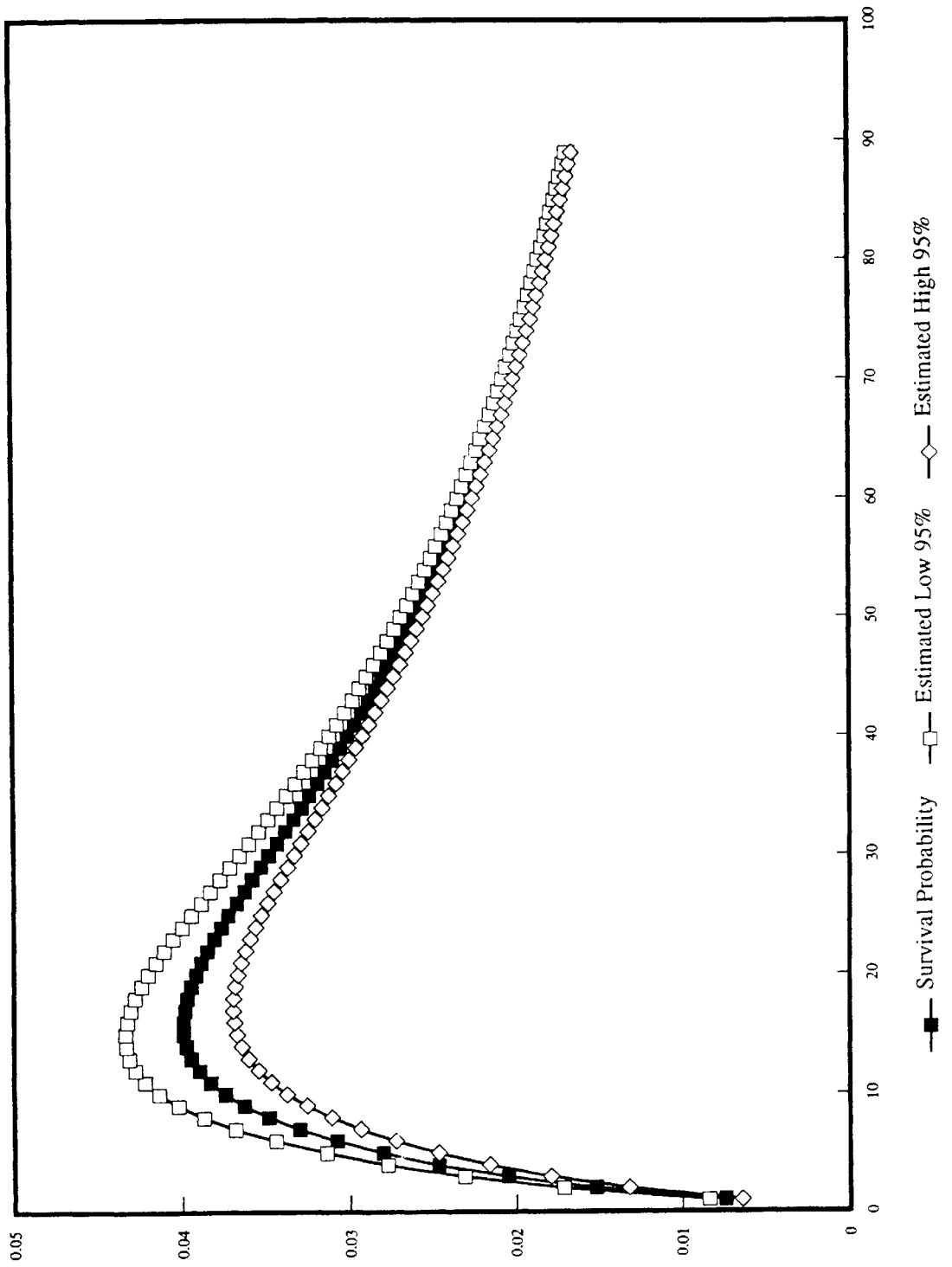
FIG. 10 is a continuation of the data depicted in FIG. 9.
Figure 11:
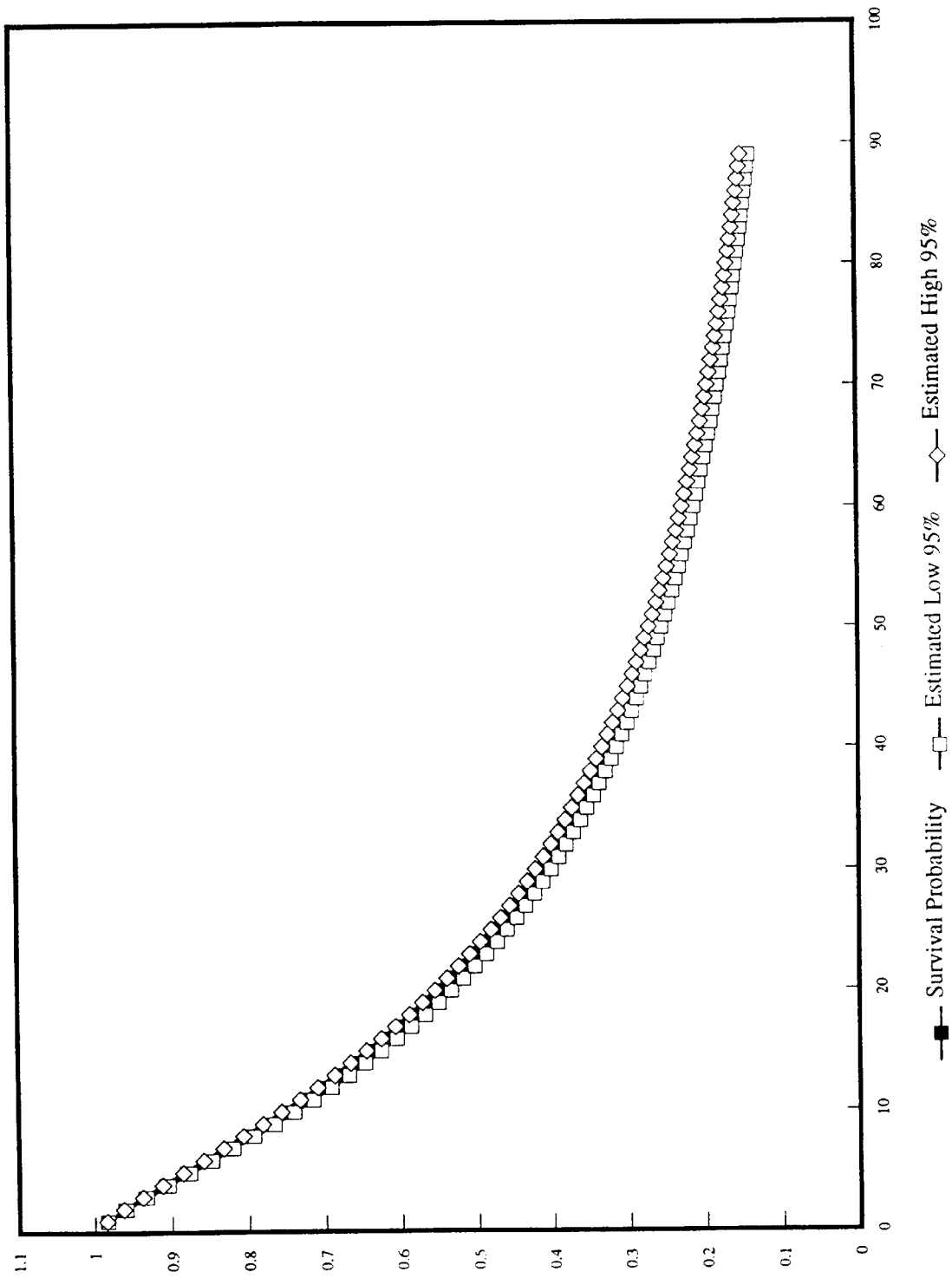
FIG. 11 graphically depicts the survival curve for the policyholder in FIGS. 9 and 10.
Figure 12:
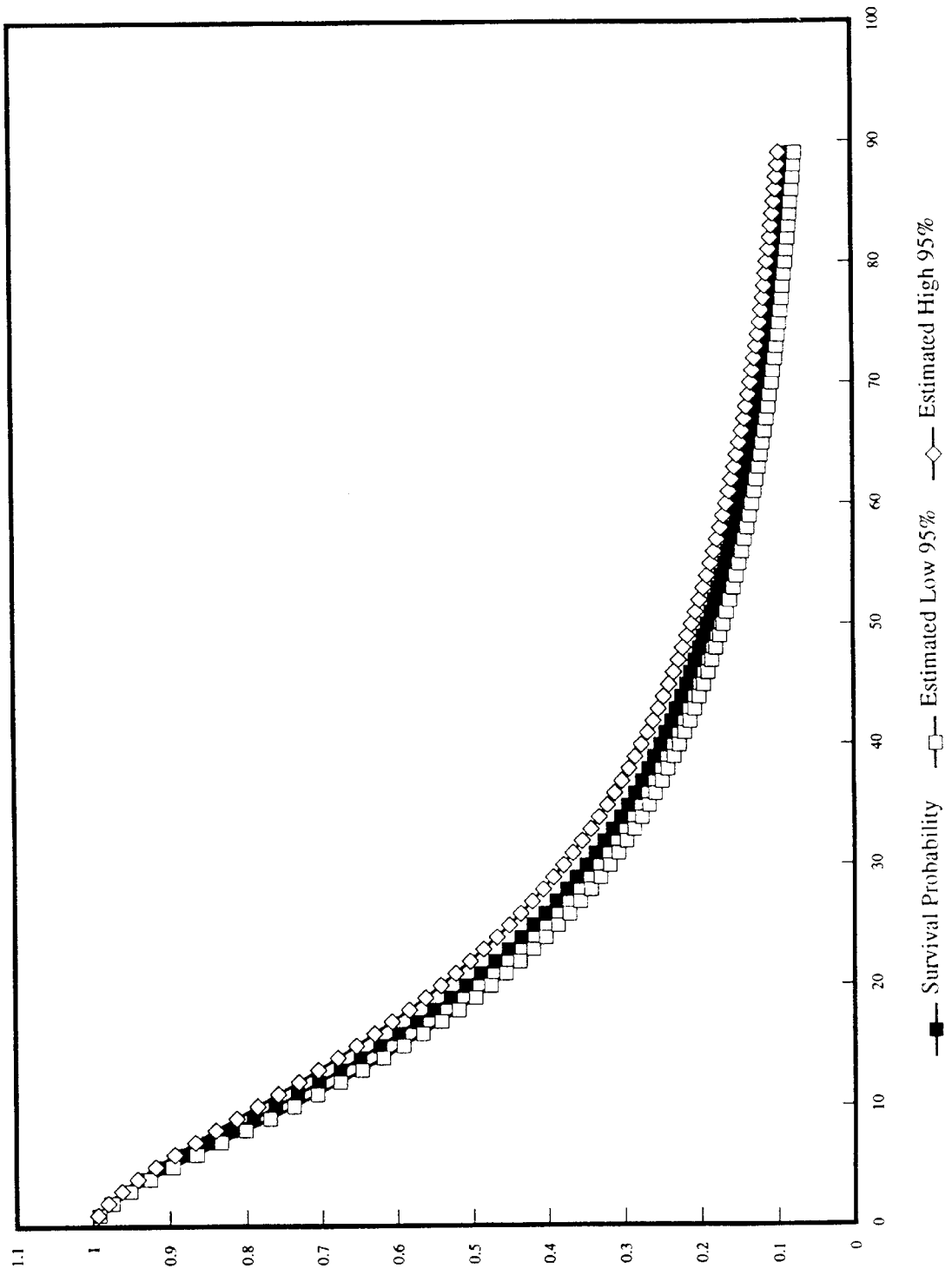
FIG. 12 graphically depicts the hazard function for the policyholder in FIG. 9.

For a white woman, aged 50, married, with regional, stage 3, AJCC type 3A non-small cell lung cancer located in the upper lobe, we supply here survival and hazard curves for two different models. As illustrated in FIG. 5, the first model uses SEER data from 1977 through 1990, but is unable to to take advantage of knowing the AJCC type since that data was unavailable before 1988. The generated survival curve is illustrated in FIG. 6 and the hazard function is illustrated in FIG. 7. As illustrated in FIGS. 8, the second model uses SEER data only from 1988 on, and is able to utilize the AJCC type. The generated survival curve is illustrated in FIG. 9 and the hazard function is illustrated in FIG. 10. The first model has a tighter specification of the survival curve because it uses a larger data set, and thus is generally more attractive for our purposes although we would need to investigate further if the models provided significantly different results. Further assumptions used are a product with a 2% annual setup charge and an interest rate 4% above the company's cost of funds, which are assumed to be fixed and drawn from a log normal distribution with a mean of 10% and a standard deviation of 1%. This individual has an insurance policy with fixed annual premiums of 0.5% of the face amount of the policy. Using the first disease model, the company would loan 25% of the face value of the policy, and expect to earn 1.9% of the face value of the policy over time. Using the second disease model, the company would loan 38% of the face value of the policy, and expect to earn 2.8% of the face value of the policy over time. The reason for the discrepancy is that AJCC type 3A designates a relatively more severe case of the disease than the average individual with regional metastases, and indicates that we should be comfortable using the results on the second model.

Although the particular embodiment shown and described above will prove to be useful in many applications in the financial and medical predictive arts to which the present invention pertains, further modifications of the present invention herein disclosed will occur to persons skilled in the art. All such modifications are deemed to be within the scope and spirit of the present invention defined by the appended claims.

We claim:

1. A system for providing a line of credit to those insured under an insurance policy without transfer of ownership of the policy, wherein the system determines eligibility and the line of credit for those insured, and wherein the system comprises:

a) entering means for entering the insured's application data including the insured's date of birth and the medical diagnosis of the insured, and for generating an output corresponding to said application data;

b) generating means for receiving said output from said entering means, for accessing a set of data relating to diseases, and for generating a function based on said output and said set of data, wherein said function has a probability distribution describing the future life probabilities of the insured;

c) computing means for receiving said function from said generating means and for computing the line of credit to be provided to the insured based upon said received function and the value of the insured's insurance policy; and transferring means for providing a line of credit to said insured and maintaining ownership of the policy with the policyholder during the lifetime of the insured.

2. The system of claim 1, wherein said generated function is asymmetric.

3. The system of claim 2, where said generating means is for generating a plurality of functions describing the life expectancy of the insured and for selecting a single function, wherein said single function, is transmitted to said computing means.

4. The system of claim 2, wherein said computing means computes a plurality of credit levels using preselected functions and selects an optimum credit level therefrom.

5. The system of claim 4, wherein said policy has a net present value associated therewith and wherein said optimum credit level is determined based on said net present value.

6. The system of claim 2, further comprising a pseudo-random number generator for providing a plurality of pseudo-random numbers, wherein said computing means computes a plurality of credit levels by using said plurality of pseudo-random numbers, and wherein said computing means determines a particular line of credit.

7. The system of claim 6, wherein said generating means uses a preselected curve based upon the insured's medical diagnosis.

8. The system of claim 7, wherein said generating means applies preselected factors to said preselected curve based upon said received output from said entering means for generating said function.

9. The system of claim 8, wherein said entering means applies preselected factors to said data based upon said application data for generating said output.

10. The system of claim 9 wherein the named beneficiary on the owners insurance policy retains an interest therein.

11. A computer implemented method of providing a line of credit to a person insured by an insurance policy without transfer of ownership of the policy, wherein the method comprises:

a) entering application data of the insured including the birth date and the medical diagnosis of the insured, into an entering device, wherein the entering step comprises generating an output corresponding to said application data;

b) accessing a set of data relating to diseases and generating a function having a probability distribution describing the future life expectancy of the insured from the application data from said output and said set of data; and c) computing the line of credit to be provided to the insured based upon the generated function and the value of the insurance policy;

providing a line of credit to said insured and maintaining ownership of the policy with the policyholder during the lifetime of the insured.

* * * * *